Feb. 23, 1954　　　C. B. DOTY ET AL　　　2,670,028
ADJUSTABLE VEHICLE SEAT
Filed May 19, 1948　　　　　　　　　　　　4 Sheets-Sheet 1
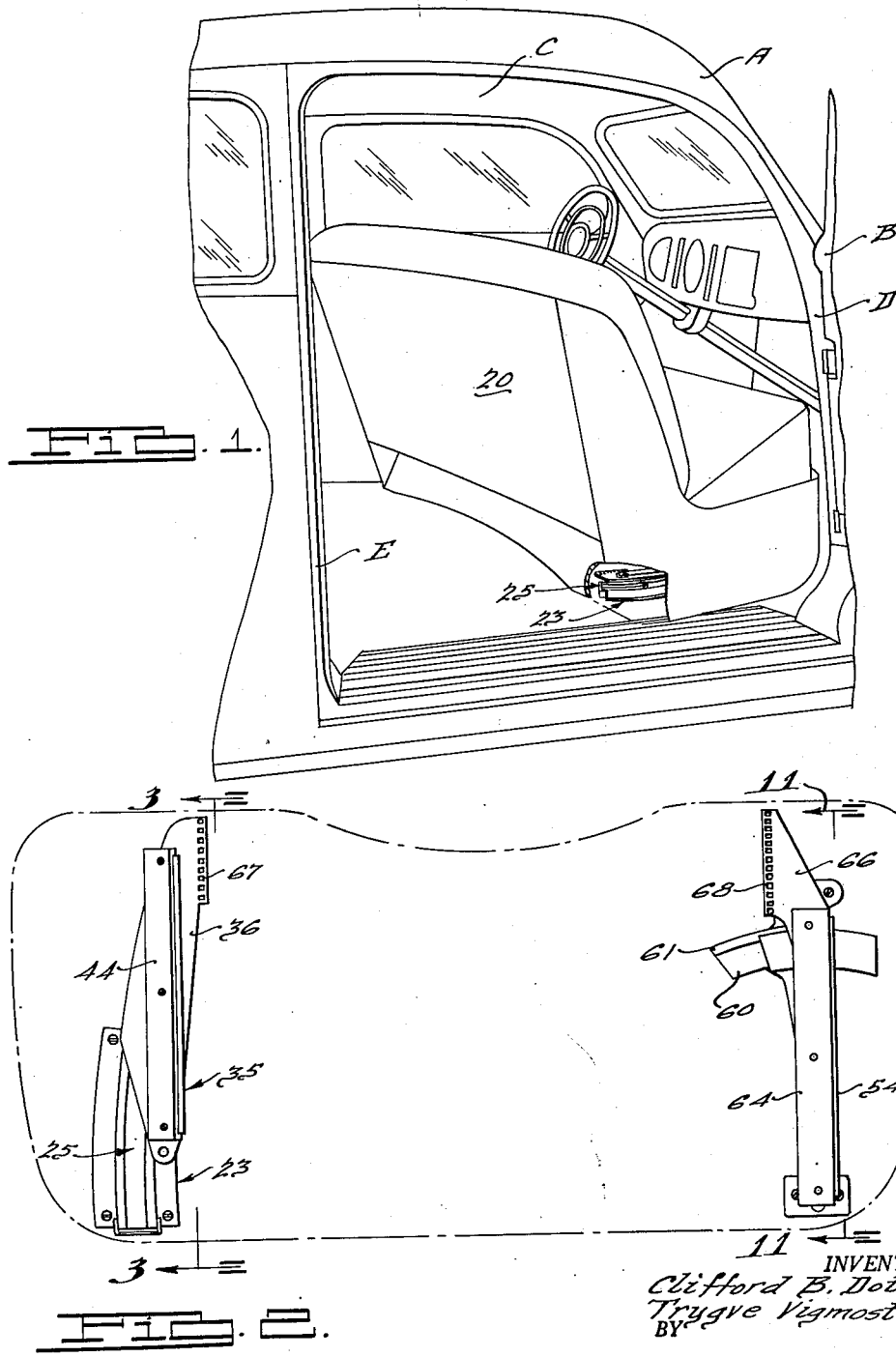
INVENTORS.
Clifford B. Doty,
Trygve Vigmostad.
BY
Elmer Jamison Gray
ATTORNEY.

Feb. 23, 1954  C. B. DOTY ET AL  2,670,028
ADJUSTABLE VEHICLE SEAT
Filed May 19, 1948  4 Sheets-Sheet 2
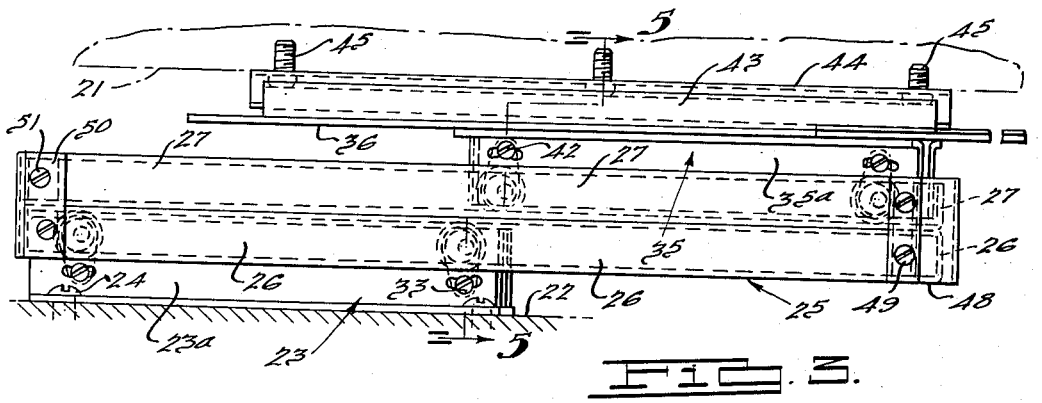
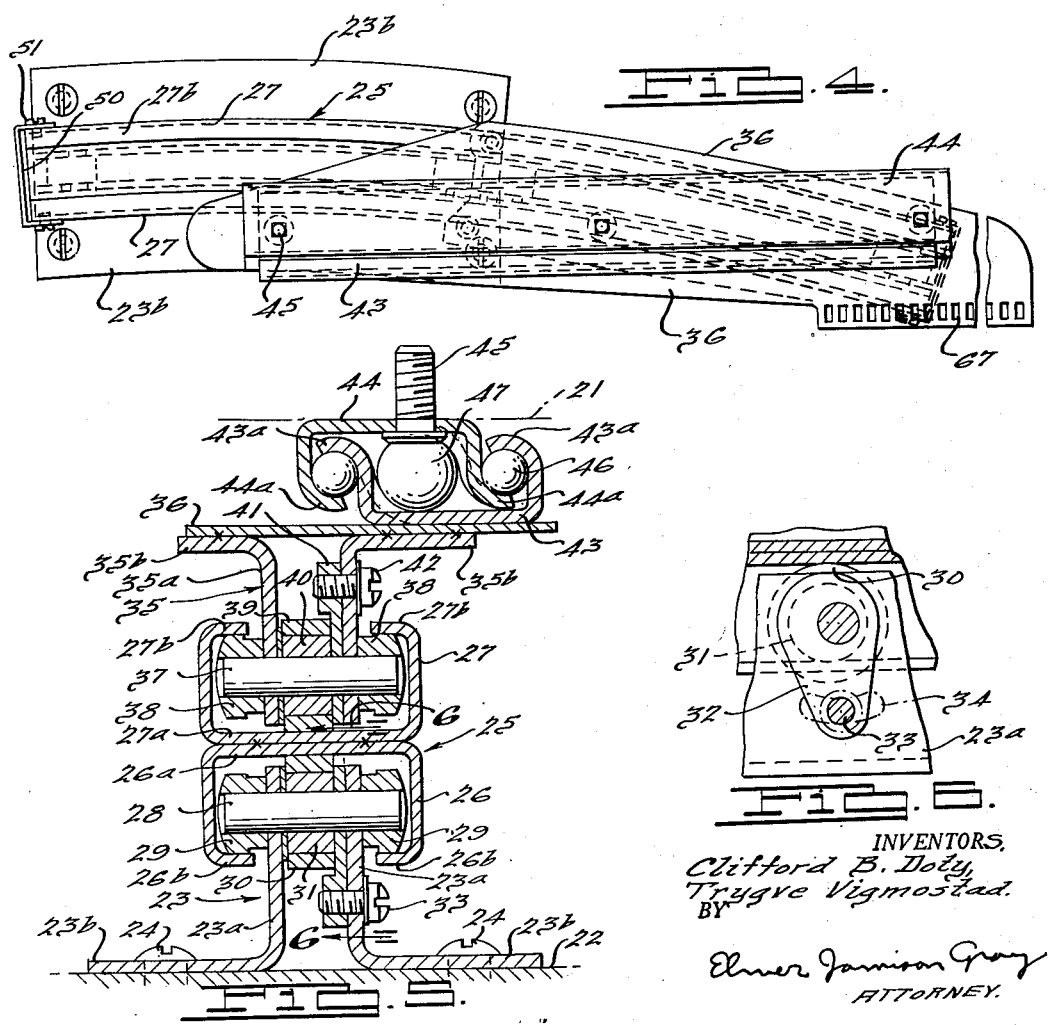
INVENTORS,
Clifford B. Doty,
Trygve Vigmostad.
BY
Elmer Jamison Gray
ATTORNEY.

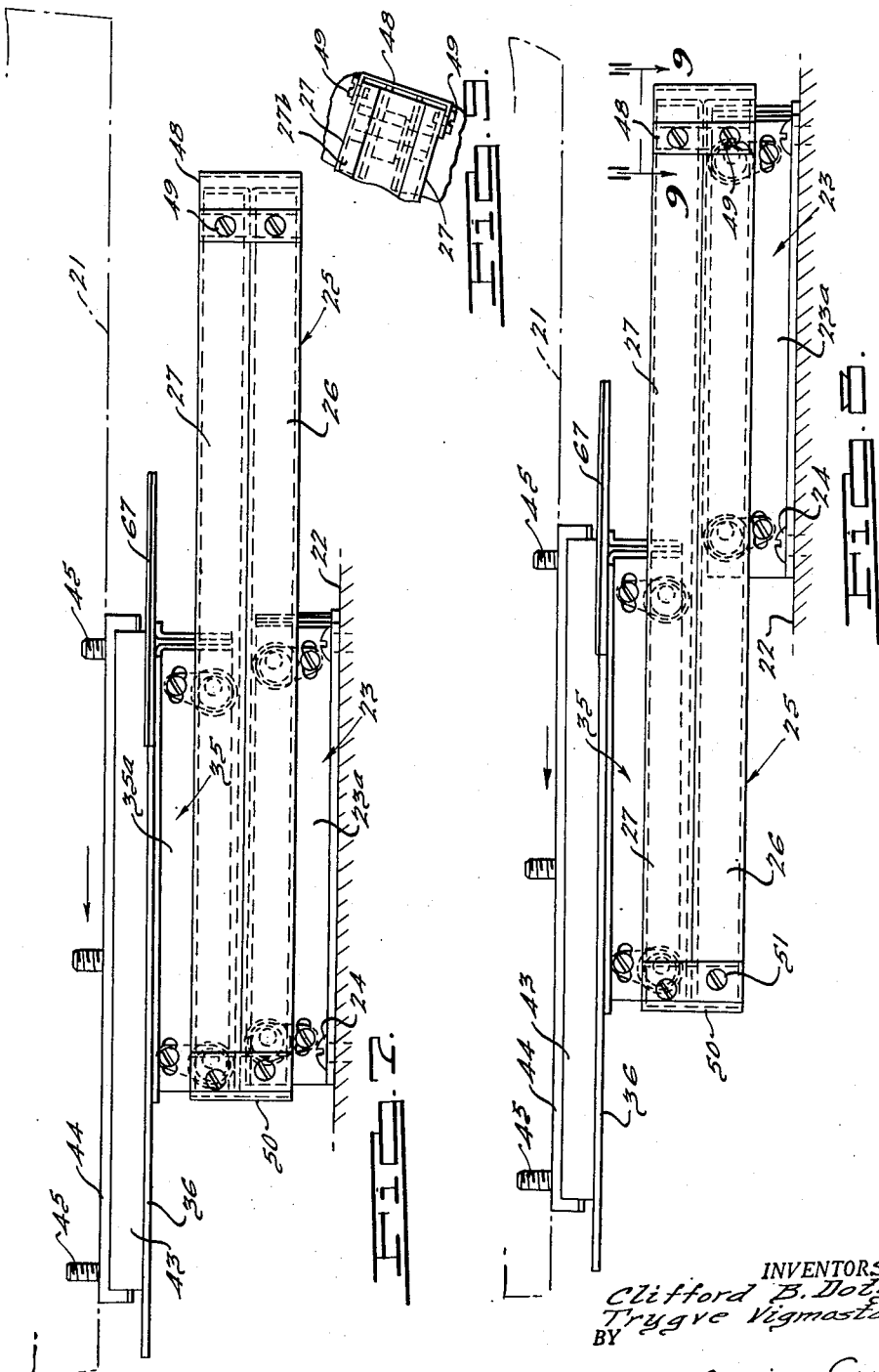

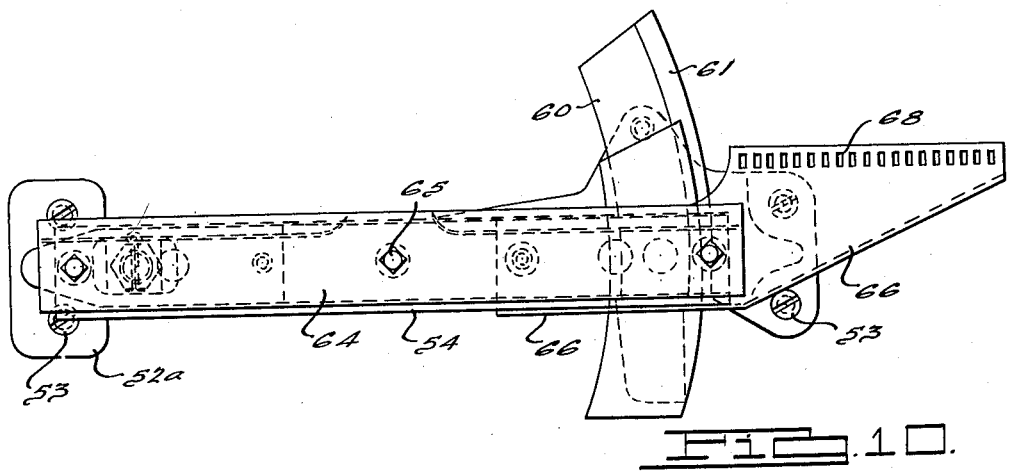
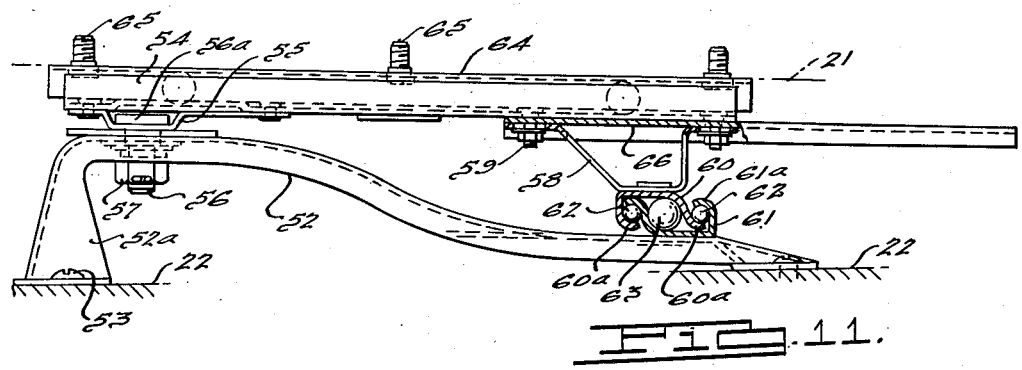

Patented Feb. 23, 1954

2,670,028

UNITED STATES PATENT OFFICE 2,670,028

ADJUSTABLE VEHICLE SEAT

Clifford B. Doty and Trygve Vigmostad, Detroit, Mich., assignors to Briggs Manufacturing Company, Detroit, Mich., a corporation of Michigan Application May 19, 1948, Serial No. 27,845

9 Claims. (Cl. 155—14)

This invention relates to seat structures and especially to adjustable seats for vehicle bodies, such as automobile bodies, the invention being particularly useful in connection with the front seats of two-door automobiles in order to facilitate access through the door opening of the rear seat passengers. In the particular embodiment herein illustrated the invention is carried out by providing the seat with a limited swinging motion in a horizontal direction in order to widen the space between the end of the seat and the rear upright edge of the door opening. It will be understood, however, that the invention may be incorporated in the seat structure so as to provide a rectilinear adjusting motion to the seat instead of a swinging motion.

An object of the invention is to provide an adjusting mechanism between the seat and floor comprising a slide unit formed of a plurality of superimposed relatively shiftable slide members which when extended will combine to furnish a materially greater range of seat motion than the range of motion available by extending only one of the slide members. As a result of this improved slide construction the maximum desired fore and aft motion may be imparted to the seat while at the same time enabling the mechanism to be more compactly built and entirely concealed beneath the seat in all positions thereof.

A further object of the invention is to provide an improved seat structure embodying means enabling the seat to be adjusted fore and aft in a rectilinear direction by the driver of the automobile while also permitting an end of the seat to be swung horizontally a limited distance sufficient to permit a passenger using the rear seat of the vehicle to enter or leave through the front door opening.

Another object of the invention is to mount the seat for fore and aft sliding motion upon a track structure which in turn is superimposed upon a fixed track structure and slidable fore and aft relatively thereto.

Still another object of the invention is to mount the seat for fore and aft motion in a curvilinear path upon a pair of upper and lower superimposed interconnected slides carried by a fixed curvilinear track, the lower slide adapted to cooperate with and travel along the fixed track, and the upper slide being secured to the seat and adapted to travel along the lower slide. With this improved construction the lengths of the slides and track may be shortened to gain the same range of seat motion as would be gained by a single relatively long slide and track, thus enabling the slide mechanism and track to be concealed beneath the seat at all times.

Other objects of this invention will appear in the following description and appended claims, reference being had to the accompanying drawings forming a part of this specification wherein like reference characters designate corresponding parts in the several views.

Fig. 1 is a fragmentary side elevation of a front end of an automobile body illustrating the front seat thereof supported for adjustment in accordance with the present invention.

Fig. 2 is a plan view of the slide mechanism in the retracted position of the seat.

Fig. 3 is a side elevation of the slide mechanism at one side of the seat, this view being taken substantially from lines 3—3 of Fig. 2 looking in the direction of the arrows.

Fig. 4 is a plan view of the structure shown in Fig. 3.

Fig. 5 is an enlarged vertical section taken substantially through lines 5—5 of Fig. 3 looking in the direction of the arrows.

Fig. 6 is a fragmentary section taken substantially through lines 6—6 of Fig. 5 looking in the direction of the arrows.

Fig. 7 is a view generally similar to Fig. 3 but illustrating the condition of the slide mechanism when the seat has reached one stage in its forward adjustment.

Fig. 8 is a view generally similar to Fig. 7 but illustrating the condition of the slide mechanism when the seat has reached the final stage in its forward adjustment.

Fig. 9 is a fragmentary plan view taken from lines 9—9 of Fig. 8 looking in the direction of the arrows.

Fig. 10 is a plan view of the slide mechanism shown in Fig. 11.

Fig. 11 is a side elevation, partly in section, taken substantially through lines 11—11 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention as applied to an automobile body A having right and left front doors B and C, respectively, these doors being hinged in the usual manner to the front pillars D of the body. The doors B and C form the closures for right and left front door openings, the rear upright edges thereof being defined by center pillars E. Arranged within the body is a front seat 20 which, when occupying its normal transverse position, blocks off the rear of the front door opening to such an extent as to render it difficult or impossible for a passenger to enter the rear of the tonneau so as to occupy the rear seat. In accordance with the present embodiment of the invention, however, one end of the seat 20 may be swung forwardly, such as in the manner shown in Fig. 1, so as to provide ample space for the rear seat passengers to enter through the front door opening. The construction of the slide mechanism, through the means of which the seat 20 is adjustable, is such as to permit a wide range of forward movement of the end of the seat while at the same time enabling the slide mechanism to be entirely concealed beneath the seat in all positions thereof. The seat 20 is provided with the usual upholstered cushion back and removable seat cushion, the latter being supported in any conventional manner on a bottom seat frame 21 between which and the floor 22 the slide mechanism embodying the present invention is interposed.

The slide mechanism, which is mounted beneath the righthand end of the seat 20, when looking forwardly, is illustrated particularly in Figs. 3 to 6 inclusive. This slide mechanism comprises a longitudinally extending arcuate bottom rail or track generally indicated at 23 which, as shown in Fig. 5, comprises two opposed angle members 23a having their vertical flanges spaced apart a suitable distance. The bottom oppositely extending flanges 23b of these angle members are mounted upon the floor 22 and are secured thereto as by means of screws 24. A longitudinally extending slide, generally indicated at 25, is slidingly mounted upon the arcuate rail or track structure 23 and is correspondingly curved. The slide 25 comprises a pair of similar channels 26 and 27, the channel 26 opening downwardly and the channel 27 opening upwardly. The bottom webs 26a and 27a of the channels 26 and 27, respectively, are arranged in abutting relation and in the present instance are spot-welded together to form a unitary slide arcuate in configuration in accordance with the arcuate shape of the rail or track structure 23.

A transverse journal pin or stud 28 extends through and is rotatable in aligned holes in the vertical flanges of the angle members 23a, and secured to the ends of this pin 28 at the outer sides of the angle members 23a are a pair of rollers 29. These rollers engage and have rolling engagement upon inturned flanges 26b of the bottom channel 26 of the slide 25, the rollers being confined within the channel 26 in the manner shown in Fig. 5. It will be understood that the track structure 23 carries, as illustrated in Fig. 3, a pair of longitudinally spaced roller devices 29 which engage the channel 26 of the slide 25 at longitudinally spaced points. Each of these roller devices also includes an intermediate roller which in the present instance is in the nature of a take-up roller comprising a rotatable sleeve or ring 30 carried by an eccentric 31 and interposed between the vertical flanges of the angle members 23a. The eccentric 31 is free on the pin 28 and is secured to a depending arm 32 having a hole through which the pin 28 extends. The lower end of the arm 32 has a tapped hole to receive an adjusting bolt 33, this bolt extending through an arcuate slot 34 in the vertical flange of one of the angle members 23a. The roller 30 is positioned so as to have rolling engagement with the upper web 26a of the channel 26. Hence, when the slide 25 is shifted fore and aft the channel 26 will roll upon the roller 30. In order to take up or compensate for variations due to production tolerances and to avoid too loose a fit causing objectionable chattering or rattling, the roller 30 may be adjusted vertically through the medium of the eccentric 31. By loosening the bolt 33 the arm 32 may be swung in order to tighten the rollers 29 and 30 against their respective engaging portions on the channel 26. After accomplishing the desired adjustment in order to take up any play the bolt 33 is tightened against displacement within the slot 34.

The slide mechanism, as shown in Figs. 3 to 6 inclusive, also comprises an upper longitudinally extending arcuate slide, generally indicated at 35, which is shiftable longitudinally upon and relatively to the intermediate slide 25. Accordingly, the upper slide 35 has the same arcuate configuration as the slide 25. This upper slide comprises a pair of opposed angle members 35a having depending vertical flanges spaced apart in accordance with the spacing of the vertical flanges of the bottom rail or track structure 23, see Fig. 5. The top oppositely extending flanges 35b of the angle members 35a engage the bottom face of a plate 36 and are spot welded thereto.

The upper slide 35, comprising the opposed angle members 35a, carries a pair of longitudinally spaced roller devices, including take-up rollers, preferably similar to the lower roller devices, above described, carried by the track structure 23. Each upper roller device, carried by the upper slide 35, comprises a transverse pin 37, similar to the pin 28, which extends through and is rotatable in aligned holes in the depending flanges of the angle members 35a. Secured to opposite ends of each pin 37 are a pair of rollers 38, similar to rollers 29, which engage and have rolling engagement with the upper inturned flanges 27b of the channel 27. Each upper roller device also includes a roller sleeve 39 interposed between the depending flanges of the angles 35a and revoluble upon an eccentric 40 free on the pin 37. Secured to the eccentric is an adjusting arm 41 which is similar to the arm 32 but arranged so as to extend upwardly. This arm 41 is adjustable so as to rotate the eccentric 40 in the same manner as the arm 32, the arm 41 being secured in adjusted position by means of a bolt 42 extending through an arcuate slot in one of the angle members 35a similar to the arcuate slot 34. The take-up roller 39 has rolling engagement with the bottom web 27a of the channel 27, and by adjusting the roller 39 through the medium of the eccentric 40 the rollers 38 and 39 may be positioned in firm engagement with the channel 27 so as to take up any play and eliminate chattering or vibratory noises during operation of the vehicle.

In the present embodiment of the invention the seat 20 is mounted upon the arcuate track structure, above described, for fore and aft adjustment in a rectilinear direction. Accordingly, in order to carry out this purpose there is provided a longitudinally extending rectilinear rail or track member 43 which is mounted upon the plate 36 and secured thereto as by spot welding. Cooperating with the track member 43 is an upper rectilinear slide 44 which is bolted to the bottom of the seat frame 21 at several points by means of threaded studs 45 extending upwardly through the seat frame and held in position by means of nuts. The slide 44 is slidable relatively to the lower track member 43, and in the present instance the members 43 and 44 are suitably flanged at 43a and 44a along their opposite edges for the retention of ball bearings 46. Also interposed between the members 43 and 44 and suitably retained in place are anti-friction ball bearings 47. From the foregoing it will be seen that the seat may be shifted fore and aft in a straight line direction and with a minimum of frictional resistance by the cooperation of the slide 44 with the rail or track member 43 and interposed antifriction ball bearings 46 and 47. It will be understood that any conventional latch device is provided for releasably locking the members 43 and 44 together in any longitudinally adjusted position of the seat and slide 44. Such a latch device, manually operable by means of a handle accessible to the driver, is conventional in the art and, hence, it is not deemed necessary to illustrate or describe the same herein.

It will be seen from the foregoing that the slide 25 is shiftable fore and aft in an arcuate path relatively to the rail or track 23. In order to limit the range of forward travel of the slide 25 there is mounted at the rear end of the slide 25 a stop engageable with the rear end of the track or rail structure 23. In the present instance this stop comprises, see Fig. 9, a channel or end cap 48 embracing and closing the rear ends of the channels 26 and 27 of the slide 25, the end cap 48 being secured in position by means of screws 49. Since the angle members 23a of the track 23 project upwardly into the channel 26 it will be readily seen that the limit of forward movement of the slide 25 will be determined by engagement of the end cap 48 with the rear ends of the angle members 23a. Since the upper slide 35 is shiftable longitudinally in an arcuate path relative to the slide 25, stop means is provided for determining the front and rear limits of travel of the upper slide 35. Since the angle members 35a of the upper slide 35 project into the channel 27, it will be seen that the end cap 48 will determine the rear limit of travel of the slide 35 by engagement of the angle members 35a with this end cap in the manner shown in Fig. 3. The forward limit of travel of the slide 35 is determined by means of a front end cap 50, similar to the end cap 48, which embraces and closes the front ends of the channels 26 and 27, being secured thereto by screws 51.

The portion of the slide mechanism in the present embodiment of the invention mounted beneath the lefthand end of the seat 20 is shown particularly in Figs. 10 and 11. This comprises a suitably shaped bracket 52 terminating at its forward end in a depending leg 52a secured by means of screws 53 to the floor 22. Carried by the bracket 52 is a track member 54 extending parallel to and similar to the track member 43. Bolted to the bottom of the track member 54 is a trunnion bracket 55 which is offset downwardly to receive the head 56a of a vertical trunnion or pivot stud 56 extending through a hole in the bracket 52. Threaded onto the lower end of the stud 56 is a nut 57. The stud thus provides a vertical pivot or trunnion about which the track member 54 and hence the seat 20 may be rotated in a horizontal direction. Hence, when the seat is swung to the position shown in Fig. 1, it will turn about a vertical axis formed by the stud 56 located at the lefthand front end of the seat. Mounted beneath the rear end of the track member 54 is a depending channel bracket 58 having upper oppositely extending flanges bolted at 59 to the bottom of the track member 54. Rigidly secured to the bottom of the bracket 58 is an arcuate slide 60 which cooperates with an arcuate track member 61 secured to the rear end of the bracket 52. The members 60 and 61 are formed with cooperating flanges 60a and 61a between which are interposed ball bearings 62. Also interposed between the members 60 and 61 are intermediate ball bearings 63. Thus, when the seat is swung about the axis formed by the pivot or trunnion 56 the rear lefthand end of the seat will swing laterally and will be guided in a short arcuate path through cooperation of the arcuate slide 60 with the arcuate track 61 and the interposed ball bearings 62 and 63.

Slidable fore and aft on the track member 54 in a rectilinear direction is an upper slide parallel to and similar to the slide 54. The members 64 and 54 correspond to the members 44 and 43 and have similar ball bearings interposed therebetween. The slide 64 carries studs 65 by means of which this slide is bolted to the bottom of the seat frame.

Interposed between the bracket 58 and the bottom of the track member 54 is a plate 66 which extends rearwardly of the track member 54, as shown in Figs. 10 and 11. The plate 36, see Fig. 4, extends rearwardly a distance corresponding to the plate 66, and these plates 36 and 66 are formed, respectively, with rack portions 67 and 68. In accordance with conventional practice the rectilinear top slide mechanism for the seat includes pinions (not shown) at opposite ends of the seat having the teeth thereof engaging in the racks 67 and 68 and connected together by means of a transverse shaft, thus causing the seat to slide fore and aft in a rectilinear direction without cocking or binding.

The operation of the seat adjusting mechanism, illustrated in the present embodiment of the invention, will be readily understood from the foregoing. The normal condition of the mechanism is illustrated in Fig. 3 in which all of the parts are mounted beneath the seat 20. When the righthand end of the seat is shifted forwardly in an arcuate path about the pivot 56, the upper slide 35 will travel forwardly a given distance relatively to the underlying slide 25 in the manner shown in Fig. 7. This movement will continue until the forward end of the upper slide 35 engages the stop 50 on the front end of the slide 25, whereupon continued forward movement of the seat will cause the slide 35 to shift the slide 25 in a forward direction relatively to the fixed bottom track 23. This movement will continue until the stop 48 on the rear end of the slide 25 engages the rear end of the track 23 as shown in Fig. 8. Upon reaching this limit of travel the seat will have reached its full forward limit of arcuate travel. In this adjusted position of the seat it will be understood that the slides 25 and 35 as well as the track 23 will be concealed beneath the seat as shown in Fig. 1.

We claim:

1. A seat adjusting structure for a vehicle body having a seat and a floor, comprising supporting mechanism adapted to be mounted in fixed positions on said floor beneath each end of the seat, means for pivotally connecting one end of the seat to one of said mechanisms, the other mechanism comprising a fixed arcuate bottom track extending generally fore and aft and having said last named means as a center of curvature, an arcuate slide carried by and having the curvature of said track and shiftable thereon fore and aft, a second arcuate slide carried by and having the curvature of said first named slide and shiftable for and aft relatively thereto, and means for attaching the second slide to the seat.

2. A seat adjusting structure for a vehicle body having a seat and a floor, comprising supporting mechanism adapted to be mounted in fixed positions on said floor beneath each end of the seat, means for pivotally connecting one end of the seat to one of said mechanisms, the other mechanism comprising a fixed arcuate bottom track extending generally fore and aft and having said last named means as a center of curvature, an arcuate slide having the curvature of said track and shiftable thereon fore and aft, a second arcuate slide having the curvature of said first named slide and shiftable thereon fore and aft relatively thereto, and fore and aft shiftable slide means for attaching the second slide to the seat.

3. A seat adjusting structure for a vehicle body having a seat and a floor, comprising a support adapted to be mounted on said floor beneath an end of the seat, means for pivotally connecting the seat to said support, a fixed arcuate track adapted to be mounted on said floor beneath the opposite end of the seat to extend generally fore and aft with said last named means approximtaely at the center of curvature, an arcuate slide having the curvature of said track and shiftable thereon, a second arcuate slide having the curvature of said first named slide and shiftable thereon, and means for attaching the second slide to the seat.

4. A seat adjusting structure for a vehicle body having a seat and a floor, comprising a support adapted to be mounted on said floor beneath an end of the seat, means for pivotally connecting the seat to said support, an arcuate track adapted to be mounted on said floor beneath the opposite end of the seat to extend generally fore and aft with said last named means approximately at the center of curvature, an arcuate slide shiftable on said track and having the curvature thereof, roller means interposed between said slide and track, a second arcuate slide shiftable on said first named slide and having the curvature thereof, roller means interposed between said slides, and means for attaching the second slide to the seat.

5. A seat adjusting structure for a vehicle body having a seat and a floor, comprising a support adapted to be mounted on said floor beneath an end of the seat, means for pivotally connecting the seat to said support, an arcuate track adapted to be mounted on said floor beneath the opposite end of the seat to extend generally fore and aft with said last named means approximately at the center of curvature, an arcuate slide shiftable on said track and having the curvature thereof, means for limiting the travel of said slide, a second arcuate slide shiftable on said first named slide and having the curvature thereof, means for limiting the travel of said second slide on said first named slide, and means for connecting the second slide to the seat.

6. A seat adjusting structure for a vehicle body having a seat and a floor, comprising a track adapted to be mounted in fixed position on said floor, a slide comprising superimposed upper and lower channel members secured together, the lower channel member embracing said track, bearing elements interposed between said lower channel member and track to permit said slide to be shifted relatively to the track, a second slide, the upper channel member embracing said second slide, bearing elements interposed between said upper channel member and second slide to permit the latter to be shifted relatively to the first named slide, and means for attaching the second slide to the seat.

7. A seat adjusting structure for a vehicle body having a seat and a floor, comprising a track adapted to be mounted in fixed position on said floor, a slide comprising superimposed upper and lower channel members secured together, the lower channel member embracing said track, bearing elements carried by the track and interposed between said lower channel member and track to permit said slide to be shifted relatively to the track, a second slide, the upper channel member embracing said second slide, bearing elements carried by the second slide and interposed between said upper channel member and second slide to permit the latter to be shifted relatively to the first named slide, means for attaching the second slide to the seat, and means for adjusting one of said bearing elements relative to said first named slide.

8. A seat adjusting structure for a vehicle body having a seat and a floor, comprising a support adapted to be mounted on said floor and to which one end of the seat is pivotally connected for horizontal swinging motion, an arcuate track adapted to be mounted in fixed position on the floor beneath the opposite end of the seat, a slide comprising superimposed upper and lower arcuate channel members secured together, the lower channel member embracing said track, bearing elements interposed between said lower channel member and track to permit said slide to be shifted relatively to the track, a second arcuate slide, the upper channel member embracing said second slide, bearing elements interposed between said upper channel member and second slide to permit the latter to be shifted relatively to the first named slide, and means for attaching the second slide to the seat.

9. In a seat adjusting structure for a vehicle body having a seat and a floor, a slide mechanism adapted to be mounted on said floor beneath the seat in supporting relation thereto, said mechanism including a fixed bottom track member adapted to be attached to the floor, roller means carried by the track member, a slide movable fore and aft along said roller means in anti-friction relation therewith, a roller carrying slide member, roller means carried thereby and movable fore and aft along said first named slide in anti-friction relation to shift said roller carrying slide member relative to said first named slide, means for attaching said roller carrying slide member to said first named slide comprising a rotatably adjustable eccentric element having said one roller means rotatable thereon, a spindle having said eccentric element rotatably adjustable thereon, said spindle being mounted on the member which carries said one roller means, and means for securing said eccentric element in fixed adjusted position with respect to said last named member.

CLIFFORD B. DOTY.
    TRYGVE VIGMOSTAD.

References Cited in the file of this patent

UNITED STATES PATENTS

| Number | Name | Date |
|---|---|---|
| 1,942,070 | Smelker | Jan. 2, 1934 |
| 2,095,442 | Jacobs | Oct. 12, 1937 |
| 2,189,396 | Greig | Feb. 6, 1940 |
| 2,202,113 | Miller | May 28, 1940 |
| 2,210,727 | McGregor | Aug. 6, 1940 |
| 2,237,843 | Rhodes | Apr. 8, 1941 |
| 2,256,023 | Harmon | Sept. 16, 1941 |
| 2,263,834 | Andersen | Nov. 25, 1941 |
| 2,277,927 | McGregor | Mar. 31, 1942 |
| 2,285,616 | Saunders et al. | June 9, 1942 |
| 2,428,217 | Hedley et al. | Sept. 30, 1947 |
| 2,563,220 | Doty | Aug. 7, 1951 |
| 2,618,312 | Bradley | Nov. 18, 1952 |